Nov. 21, 1939.   R. W. McLEAN   2,181,091
TEXTILE MACHINE
Filed Aug. 20, 1937   4 Sheets-Sheet 1
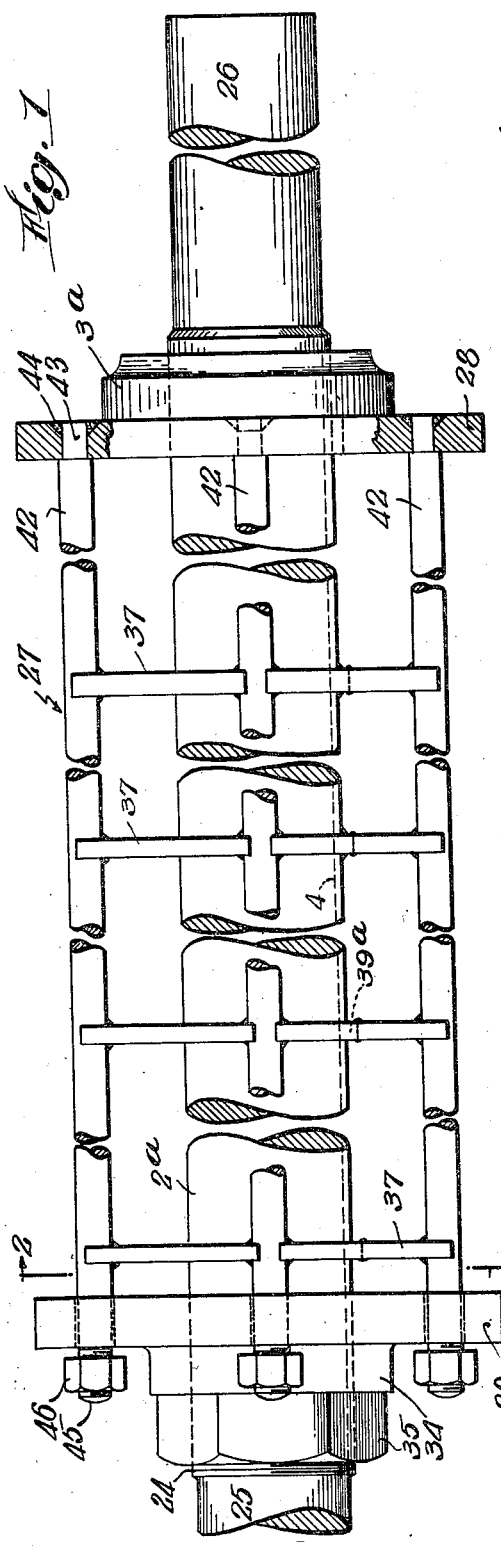
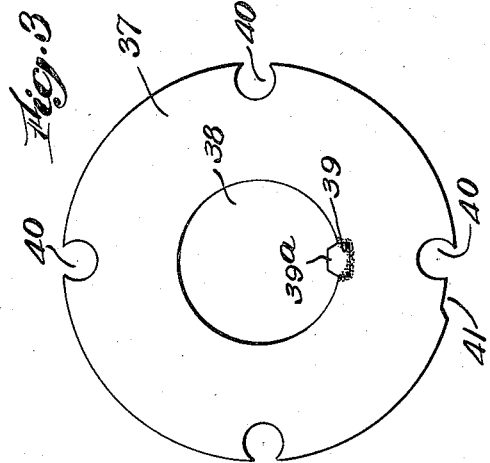
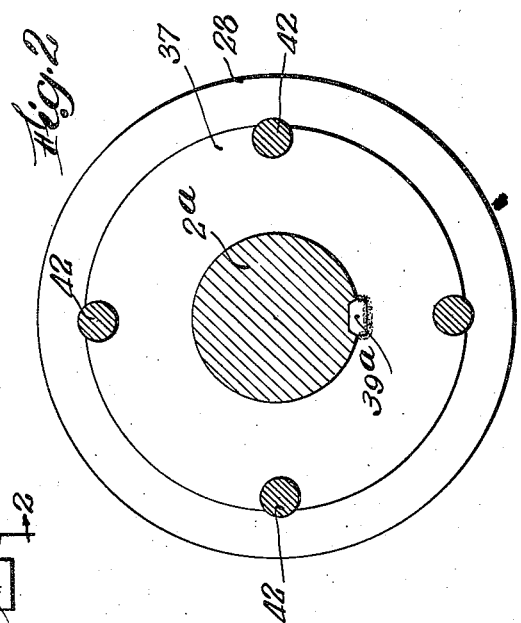
Inventor:
Robert W. McLean
by Roberts Cushman & Woodberry
Attys.

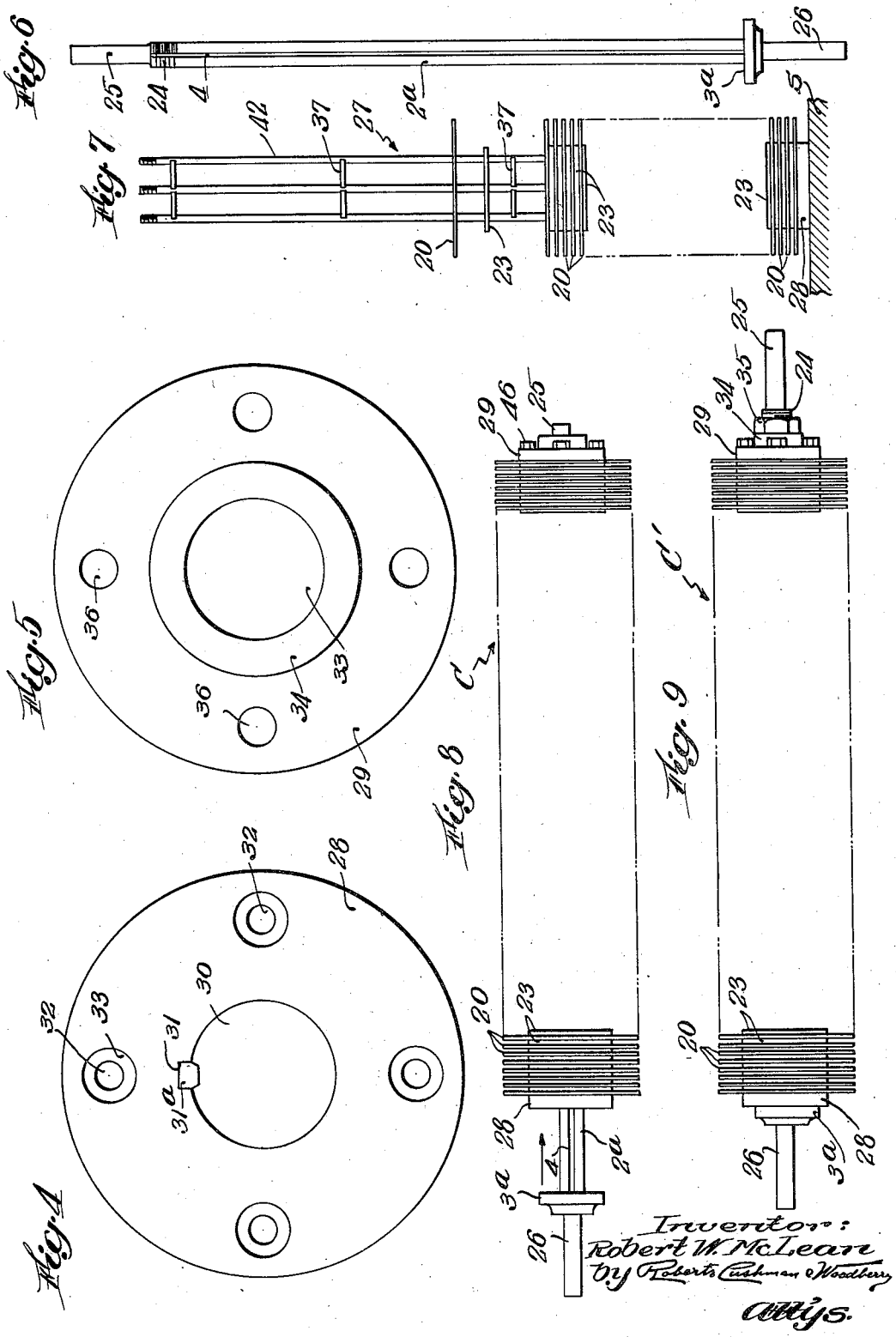

Nov. 21, 1939.  R. W. McLEAN  2,181,091
TEXTILE MACHINE
Filed Aug. 20, 1937  4 Sheets-Sheet 3
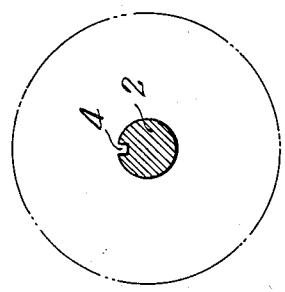
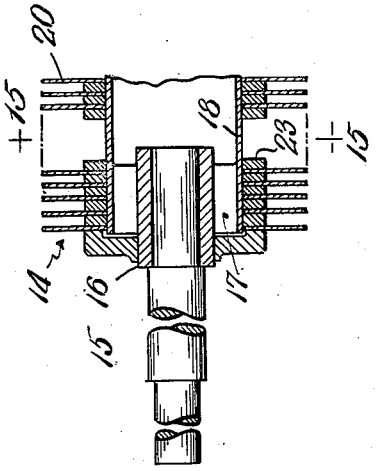
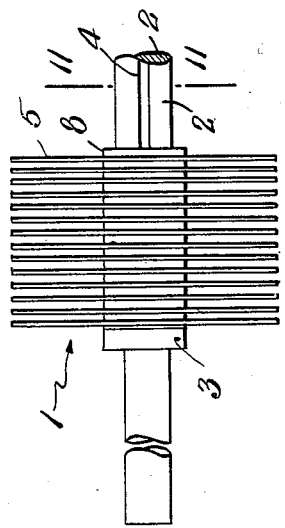
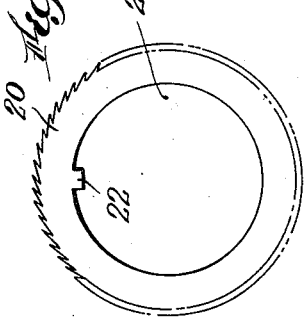
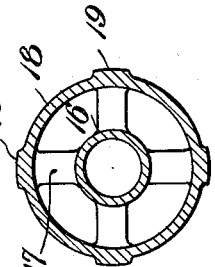
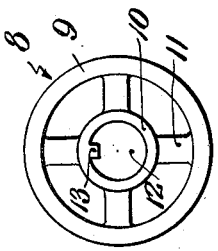
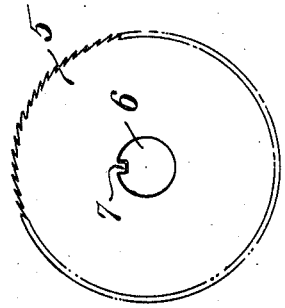
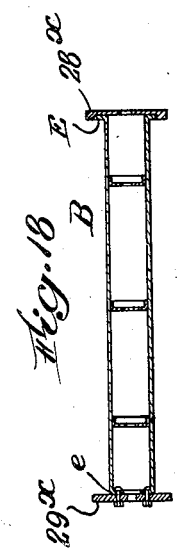

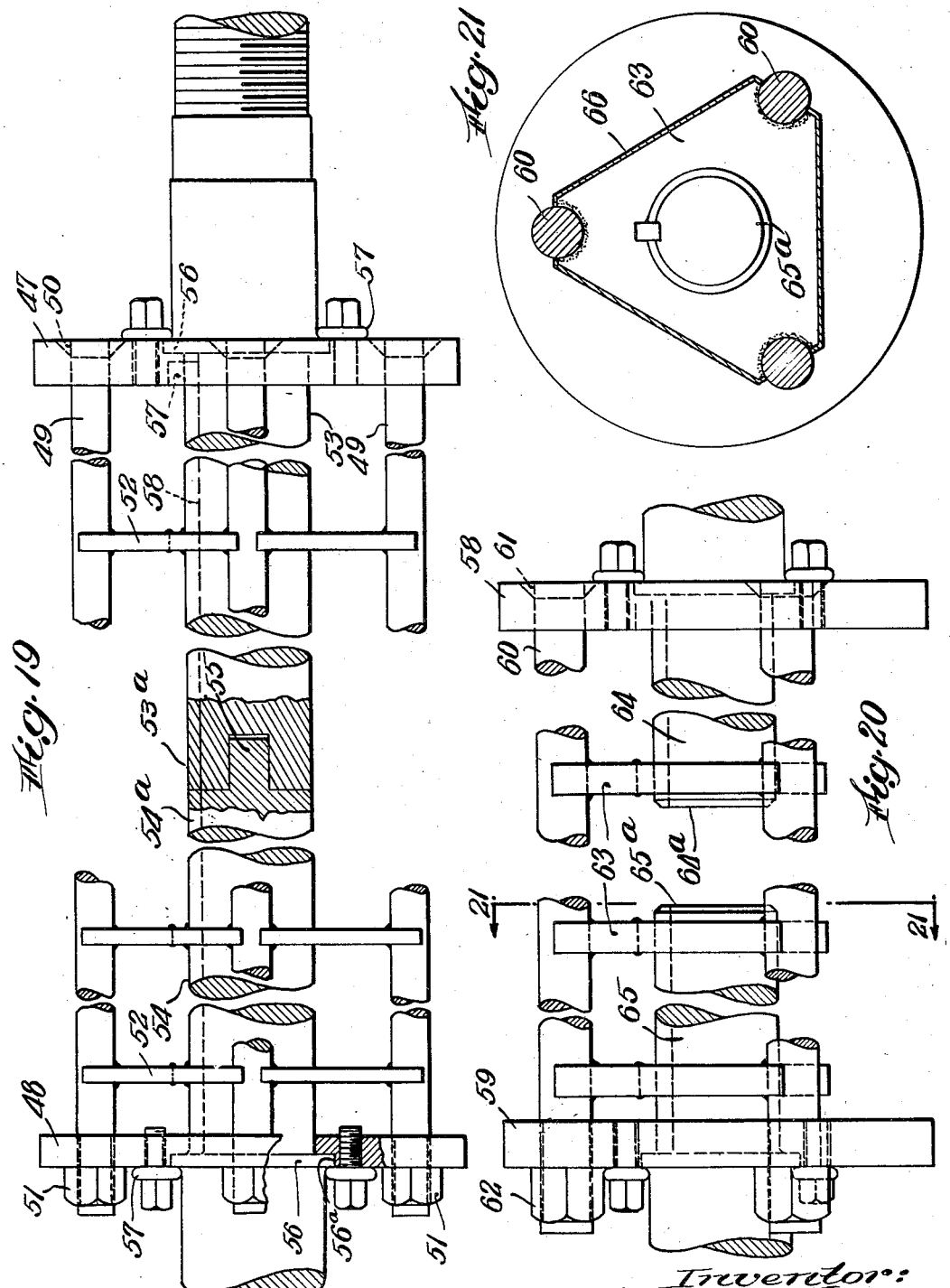

Patented Nov. 21, 1939

2,181,091

UNITED STATES PATENT OFFICE 2,181,091

TEXTILE MACHINE

Robert W. McLean, Bridgewater, Mass., assignor to The Murray Company, Dallas, Tex., a corporation of Texas Application August 20, 1937, Serial No. 160,070

11 Claims. (Cl. 19—63)

This invention pertains to textile machines and more especially to saw cylinders such as are used in gins, linters, etc. Such a saw cylinder comprises a shaft (usually provided with journal portions at its opposite ends) having mounted thereon in uniformly spaced, parallel relation a large number of circular saws having toothed edges designed, for example, to remove useful fiber from its attachments as the cylinder is rotated.

Saw cylinders of commercial type are of two general kinds, to wit, the so-called "whole saw cylinder", whose saws each has a relatively small central aperture, the several saws being mounted upon a one-piece shaft of substantially uniform diameter which extends throughout the entire length of the cylinder and to which the individual saws are directly splined. The other type of cylinder, known as the "duplex cylinder", has a relatively large central portion or drum for the reception of saws provided with large central apertures which fit snugly over this large-diametered drum, the drum being furnished at its opposite ends with trunnions which take the place of the long shaft of the whole saw cylinder.

Both types of cylinder are in common use and this necessitates the manufacture of saws having central apertures of two different diameters, although the saws are in other respects identical. The making, handling and sale of two kinds of saw, all designed to perform the same function, is annoying to those engaged in the trade, whether they be saw manufacturers, supply men, or users, and accordingly it is desirable and a principal object of the present invention is to provide means whereby the whole saw cylinder shaft may be adapted to take saws particularly designed for use in the duplex type cylinder.

As a further advantage of the present invention it may be noted that the shaft of the whole saw cylinder is of substantially uniform diameter, not substantially greater than the diameter of the journal portions which turn in the bearings of the gin or linter, and since this shaft is long and carries a very substantial load there is a tendency for such a saw cylinder to deflect between its journals and thus seriously to interfere with accurate operation. This defect is avoided by the present invention, which adds greatly to the stiffness of the shaft and thus maintains the cylinder true during use.

A further advantage of the invention results from the fact that by its use it is possible to make up cylinders (including the assembled saws and spacers but without the shaft) and hold them in storage in readiness to be exchanged at any time for a cylinder which requires sharpening or replacement. It is customary in the mills to replace a large proportion of the cylinders in the mill at substantially the same time, but this means a cessation of production until the new saws can be built up and put in place. By the present invention this delay is substantially avoided since the saws and spacers may be assembled to form integral units ready for application to the saw shafts, and when the cylinders must be exchanged, it is merely necessary to slip off an old unit and slip on a previously assembled unit and secure it to the shaft, an operation which consumes but little time and thus does not require that the gin be kept out of operation for nearly so long a period as has previously been requisite.

The duplex cylinder, as above noted, usually comprises a drum portion of large diameter having trunnions fixed permanently to its opposite ends and on these trunnions are mounted the inner raceways of anti-friction bearings. In order to remove the saws and spacers from such a cylinder it is first necessary to remove the bearing and its housing from one of the trunnions, and as the bearing is secured to the trunnion with a driving fit as well as by means of a clamping nut, the removal and replacement of the bearing, without injury to the bearing and cylinder, involves mechanical operations which the oil mill is not ordinarily well-equipped to perform. A further object of the invention is to provide a saw support adapted to receive saws of the duplex cylinder type, and which, with its saws, may be applied as a unit, if desired, to the long shaft of a whole saw cylinder, or which, alternatively, may be provided with removable shaft members or trunnions so that one or both of such trunnions may readily be removed, together with its bearings from the support, so as to facilitate removal and replacement of the saws.

Other and further objects and advantages of the invention will be pointed out hereinafter in the more detailed description and by reference to the accompanying drawings wherein Fig. 1 is a fragmentary elevation, partly in radial section, illustrating a saw cylinder shaft having mounted thereon a saw cylinder support in accordance with the present invention;

Fig. 2 is a section on the line 2—2 of Fig. 1;

Fig. 3 is an elevation of a transverse web member constituting a desirable element of the saw support in accordance with the present invention;

Fig. 4 is a view showing the outer face of the fixed head of the saw support;

Fig. 5 is an elevation showing the outer face of the removable head of the saw support;

Fig. 6 is an elevation of a saw cylinder shaft similar to that used in an ordinary whole saw cylinder but slightly modified to adapt it for use with the improved saw cylinder support;

Fig. 7 is a side elevation of the saw cylinder support or adapter with the removable head removed and showing how the saws and spacers may conveniently be assembled on this support or adapter;

Fig. 8 is a diagrammatic view showing the filled support, adapter or cage with both heads in place and showing how a shaft like that of Fig. 6 may be assembled with this saw support;

Fig. 9 is an elevation showing a filled saw support with the shaft completely assembled therewith and secured thereto;

Fig. 10 is a fragmentary side elevation illustrating a whole saw cylinder of substantially usual type;

Fig. 11 is a section on the line 11—11 of Fig. 10;

Fig. 12 is a side view of a saw useful with the shaft of Figs. 10 and 11;

Fig. 13 is a side view of a spacer device useful with a saw shaft like that of Fig. 10;

Fig. 14 is a fragmentary section illustrating a duplex saw cylinder of a well-known type;

Fig. 15 is a section on the line 15—15 of Fig. 14;

Fig. 16 is a side elevation of a saw useful with the shaft of Fig. 14;

Fig. 17 is a side view of a spacer ring useful with the shaft of Fig 14;

Fig. 18 is a diagrammatic longitudinal section, to small scale, illustrating a saw cylinder support of a modified construction;

Figs. 19 and 20 are views generally similar to Fig. 1, but illustrating modifications, but with certain parts omitted or in section; and Fig. 21 is a section on line 21—21 of Fig. 19.

Referring first to Figs. 10 to 17 inclusive, the numeral 1 designates a whole saw cylinder of a common type comprising a saw shaft 2 provided with a fixed head or abutment 3 near one end and with a longitudinally extending splineway 4. On this shaft are mounted saw blades 5 (Fig. 12) each having a central aperture 6 of a diameter such as to fit snugly over the shaft 2,—each blade being provided with an inwardly directed lug 7 designed to fit within the splineway 4 and thus to prevent the saw from turning on the shaft. To hold the several saws in spaced relation, spacers 8 (Fig. 13) are provided, each spacer usually having a circular rim 9 of an axial thickness equal to the desired spacing between the saw blades and having a hub portion 10 connected to the rim 9 by spokes 11. The hub is furnished with a central opening 12 adapted to fit over the shaft 2 and with a lug 13 designed to fit within the splineway 4. The saws and spacers are mounted in alternation upon the shaft, and at that end of the shaft which is not shown in the drawings there is provided a clamping nut or other device for clamping the saws and spacers firmly together upon the shaft. The opposite end portions of the shaft 2 form journals which are designed to turn in suitable bearings provided in the frame of the gin or linter.

As compared with this whole saw cylinder, the duplex saw cylinder 14, shown in Fig. 14, comprises short shaft members 15, of which but one is shown in the drawings, each short shaft member being provided at its end with a journal portion and having permanently fixed to its other end portion a sleeve member 16 from which project spokes or web members 17 integrally or otherwise united to a cylindrical drum portion 18 of a diameter substantially larger than the shaft member 15. This drum member is usually furnished with three or more longitudinally extending ribs 19 (Fig. 15) designed to fit snugly within the central apertures 21 of saws 20 (Fig. 16), each saw having an inwardly directed lug 22 which is designed to engage the lateral surface of one of the ribs 19 of the drum 18 and thus to prevent the saws from turning on the drum. Interposed between these saws 20 are spacer rings 23 (Fig. 17) which may be plain rings but which, if desired, may be furnished with lugs like the lug 22 to prevent them from turning on the drum.

It is manifest by comparison of Figs. 16 and 12 that the saws 20 and 5 respectively have central apertures of different diameters and that the saws 5 could not be mounted on the drum 18 of the duplex saw cylinder and likewise that the saws 20 could not be mounted directly upon the shaft 2 of the whole saw cylinder. Among other things, the present invention makes it possible to mount saws such as the saws 20 upon shafts like the shaft 2 and thus makes it unnecessary to manufacture and stock saws like the saws 5.

Referring to Figs. 1 to 9 inclusive, the shaft 2ª (Figs. 1 and 6) is in general similar to the shaft 2, being of nearly uniform diameter from end to end and having the journal portions 25 and 26 at its ends and the fixed abutment or head member 3ª, for example, near the journal portion 26, while near its other journal portion, the shaft is provided with screw threads 24. The shaft is also furnished with a longitudinally extending splineway 4. This shaft, if desired, may be made from one of the usual whole saw cylinder shafts 2 merely by turning down the diameter of the abutment 3 of the latter shaft to reduce it to the proper dimensions for use in the present invention.

Upon this shaft 2ª there is removably mounted a saw supporting unit or adapter 27 (Fig. 1), here shown as of open cage-like construction, although the invention is not necessarily limited to this precise arrangement. This saw support or adapter comprises the fixed head member 28 (Figs. 1 and 4) furnished with a central opening 30 designed to slip over the shaft 2ª and preferably having an inwardly projecting lug 31ª designed to engage the splineway 4 of the shaft. For convenience in manufacture this lug 31ª is formed as a separate element which is set into a recess 31 formed in the head 28 and which may be secured in position by electric welding or the like. The head 28 is furnished with a plurality of symmetrically spaced openings 32 which are preferably countersunk as shown at 33 at the outer side of the head.

The cage-like adapter or support also comprises the removable head 29 (Figs. 1 and 8) which is likewise furnished with a central aperture 33 designed to fit snugly about the shaft 2ª, the head preferably having a projecting annular flange 34 on its outer face designed for engagement by a clamping nut 35 having screw-threaded engagement with the screw threads 24 of the shaft 2ª. The head 29 also has holes 36, corresponding in number to the holes 32 in the fixed head 28, and which are aligned with the respective holes 32 when the parts are assembled.

The saw support or adapter 27 is also preferably furnished with one or more stiffening webs or brace members 37 (Figs. 1 and 3) interposed between the heads 28 and 29. These stiffener members or braces 37 (Fig. 3) are in the form of rings, each having a central aperture 38 designed to fit snugly over the shaft 2ª and each preferably furnished with an inwardly directed lug 39ª preferably furnished as a separate member fitted into a recess 39 in the ring and permanently secured to the ring, as by welding.

Each ring member 37 is also furnished with uniformly spaced openings or recesses 40, the number and spacing of these recesses being similar to that of the openings 32 and 36 in the heads 28 and 29, respectively. As illustrated in Fig. 3, these recesses intersect the edge of the ring, and the edge portion of the ring, adjacent to one at least of these recesses is preferably cut away, as shown at 41, to facilitate the assembly of the saws upon the support or adapter, as herein more fully described.

The saw support or adapter 27, as here illustrated, also comprises a plurality of rigid rods or bars 42, in number equal to the number of openings 32 and 36 in the heads 28 and 29, each rod preferably having a portion 43 of reduced diameter which is fitted into one of the openings 32 of the fixed head 28 and which is welded to the head, as shown at 44, by welding metal disposed in the countersink 33. While the union of these rods or bars to the head 28 may be done by welding, it is also contemplated that it may be done by a riveting or equivalent operation.

The opposite ends of the rods 42 are screw threaded at 45 for the reception of clamping nuts 46. The webs or bracing rings 37 are uniformly spaced longitudinally of the adapter, the bars 42 passing through the recesses 40 of the respective webs, and the webs preferably are welded or otherwise permanently secured to the bars. The head 28 with the parallel bars 42 fixedly secured thereto and with the spaced web members 37 rigidly secured to the several bars thus constitutes a substantially rigid support for the saw blades. While four bars 42 are shown in Fig. 1, it is to be understood that the invention is not necessarily confined to this particular number of bars, but it is to be understood that whatever number of bars be employed, they should be symmetrically spaced and so disposed that a circle, having its center at the axis of the shaft and tangent to the outer portions of the several bars, will be of a diameter substantially equaling the internal diameter of a saw of the type of the saw 20 designed for use with a duplex saw cylinder.

While the support or adapter just described is of open-work or cage-like form, comprising the spaced bars 42, it is contemplated that instead of the bars which collectively form a barrel-like centering device for the several saw blades and spacers, a tubular barrel member B (Fig. 18) of sheet metal or the like may be employed, having one end E fixedly secured, for example by welding, to the head 28ˣ and having provision at its other end e for removably clamping the head 29ˣ to it—the barrel having a longitudinal rib, slot, or fold for engagement with the projections 22 of the saws.

It will be noted that the outer surface of the head 28 is substantially flat so that the support or adapter, when removed from the shaft, may readily be stood on end upon a suitable support S, as illustrated in Fig. 7. Thus with the head 29 removed and with the adapter resting on the support S, it is very easy to assemble the saw blades 20 and spacers 23, merely by slipping them down one after another over the upper end of the barrel or cage-like centering device constituted by the rods 42 and spaced webs 37. In thus slipping the blades and spacers along the barrel, the lugs 22 of the saws are so disposed that they can pass the web members at the recessed portions 41 of the latter. After the saws and spacers have thus been assembled, the head 29 is slipped down over the ends of the rods 42 and the nuts 46 are applied and screwed up tight, thus forming a complete unitary assembly of saws and spacers having the saws and spacers firmly clamped together in face to face relation between the heads 28 and 29, the saws being prevented from rotating relatively to each other or with reference to the support or adapter by engagement of their lugs 22 with one of the rods 42.

This unit of assembled saws and spacers may now readily be mounted upon the shaft 2ª in the manner indicated in Fig. 8 merely by entering the end 25 of the shaft into the passage through the unit, the shaft being so rotated relative to the unit as to cause the lugs 31ª and 39ª to enter the splineway 4. When the abutment member 3ª of the shaft engages the head 28, the nut 35 is threaded over the end 25 of the shaft and engaged with the screw threads 24 and then tightened so as firmly to clamp the unit to the shaft. The complete saw cylinder C¹ (Fig. 9) is now ready to be mounted in the bearings of the gin or linter.

Since the shaft 22 is in all essentials like the usual whole saw cylinder shaft, it becomes possible, by the practice of the present invention, to use saws 20 only, in a mill partly equipped with shafts of the whole saw cylinder type so that the mill owner need only provide himself with one type of saw.

Furthermore, the application of the adapter 27 to a shaft of the whole saw cylinder type substantially converts such shaft into a shaft of the duplex type, greatly increasing its stiffness and in fact making it even stronger and stiffer than the usual duplex type shaft.

Moreover, since the saws and spacers are assembled on the shaft as a unit, it requires but a very short time to change the saw cylinders in a mill, and by providing an extra set of the adapters, the mill owner may always have in stock a set of saw assembly units in readiness for exchange with units which have become worn and need replacement. Furthermore, since the shaft 2ª is not subject to flexing during use, as is often the case with the heavily loaded whole saw type of shaft, the shaft may be expected to outlast the usual whole saw type shafts and the mill owner may purchase new adapters from time to time as necessary without requiring that he buy the entire cylinder, including the shaft. Even more important is the fact that with this improved construction the saw cylinder runs true and thus a much more accurate setting and a more uniform production of lint may be obtained than is commonly possible when using the whole saw type shaft.

As illustrated in Fig. 19, the saw support comprises the spaced heads 47 and 48 normally united by the intervening barrel or cage device shown as consisting of a plurality of rigid rods 49. These rods are preferably fixed to the head 47, for example by welding or by brazing as shown at 50, but are removably secured to the head 48 by means of clamping nuts 51 having threaded engagement with the screw-threaded ends of the rods. Preferably, this barrel or cage is stiffened intermediate the heads by one or more transverse web members 52 which are preferably permanently secured as by welding to the several rods 49.

Each of the heads 47 and 48 is provided with a central opening—the respective openings being designed to receive trunnion members 53 and 54 respectively. As illustrated in Fig. 19, the inner ends of the trunnion members are arranged to engage each other, the end 53a of the member 53 having an axial socket which receives an axial boss 55 projecting from the end 54a of the trunnion 54. The engagement of this boss in the socket insures axial alignment of the trunnions, although permitting their ready separation in an axial direction. To accommodate the inner portions of these trunnions, the webs 52 are furnished with central openings which are coaxial with the openings in the heads.

Each trunnion is furnished with a radial flange 56 which preferably seats in a shallow recess 56a in the outer surface of the corresponding head, and each trunnion is normally rigidly secured in place by means of the shoulder bolts 57 which engage threaded openings in the respective heads and which have peripheral ribs which engage the flange 56 and thus clamp the flange firmly in the corresponding recess 56a. However, by removing the bolts 57 the trunnion may be removed from the saw support by pulling it axially out from the opening in the respective head.

While, as illustrated in Fig. 9, both trunnions may be removed with their assembled anti-friction bearings (not shown) thereby to facilitate the slipping of the saws onto or off of the support, it is contemplated that one of the trunnions may be permanently fixed to its head, as for example by welding or brazing, if desired, since it is only necessary that one trunnion with its bearing be removable in order to permit the saws to be slipped into place.

In Figs. 20 and 21, a slight modification is illustrated wherein the support comprises the heads 58 and 59 with the intervening barrel or cage formed by the rigid bars 60 welded to the head 58 as at 61, and removably secured to the head 59 by means of the nuts 62. The support is also preferably provided with webs 63 intervening between the heads 58 and 59 and permanently secured to the bars 60. In this instance, however, there are but three of the bars 60, said bars being disposed to form an equilateral triangle, and providing a three-point bearing for each saw.

As in the arrangement of Fig. 19, each head is furnished with a central opening for the reception of trunnion members 64 and 65 respectively, the webs 63 also being furnished with openings to receive the inner portions of the trunnions. However, in this instance the inner ends 64a and 65a of the trunnions are not in contact, and the spaced bearings furnished by the heads and the web members are relied upon to hold the trunnions in proper alignment.

If desired the spaces between the several bars 60 may be closed, for example by means of sheet metal members 66 (Fig. 21) welded at their longitudinal edges to the respective bars and which thus collectively form a closed triangular barrel-like support.

While certain desirable embodiments of the invention have herein been shown and described by way of example, it is to be understood that the invention is not necessarily limited to these precise constructions but is to be regarded as broadly inclusive of all equivalents such as fall within the terms of the appended claims.

I claim:

1. An adapter device for supporting duplex saw cylinder type saws upon a whole saw cylinder type shaft of circular cross section, comprising a cylindrical support of an external diameter substantially equaling the diameter of the aperture in a standard duplex type cylinder saw, and having an axial passage of a diameter such as to receive a whole saw cylinder type shaft with a snug fit, means for securing a series of duplex cylinder type saws with rigid intervening spacers upon said support before mounting the latter upon the shaft, and means whereby the support with the saws and spacers assembled thereon may be removably fixed as a unit to a whole saw cylinder type shaft.

2. A saw support for use with a saw cylinder shaft of the whole saw cylinder type, said support comprising an elongate cage-like portion of an effective external diameter such as snugly to fit within the central aperture of a saw of the duplex saw cylinder type, the support comprising means for clamping a series of saws and rigid spacers in relatively fixed position thereon, the support having an axial passage of a diameter such as to receive a whole saw cylinder type shaft of usual external diameter, said support also comprising a part cooperable with a shaft of the whole saw cylinder type to prevent relative rotation of the support and the shaft when the shaft is mounted thereon.

3. The combination with a saw cylinder shaft of the whole saw cylinder type, of substantially uniform diameter including journal portions and having a fixed abutment near one end, of a saw assembly unit comprising an elongate support having an axial passage for the shaft, said support including spaced heads and an intervening cage-like barrel portion uniting said heads, said barrel portion being of an effective external diameter such as to receive a standard saw of the duplex saw cylinder type, one of said heads being removable from the barrel portion, means operative to clamp said removable head to the barrel portion, a series of saws and intervening rigid spacer members mounted upon said barrel portion and clamped between the heads, releasable clamping means engageable with one of said heads and operative to force the other of said heads into contact with the abutment member of the shaft, and means operative to prevent relative rotation of the saw assembly unit and shaft when the unit is mounted upon the shaft.

4. A saw assembly unit ready for application to a saw cylinder shaft, said unit comprising a series of saws and rigid intervening spacers, an elongate cage-like cylindrical support upon which the saws and spacers are mounted in coaxial relation, the support comprising at least four longitudinally extending circumferentially spaced saw centering elements, and spaced heads disposed respectively at opposite ends of the series of saws and spacers and means uniting said heads to the cage-like support, the support being provided with means cooperable with each saw to prevent rotation of the saw relative to the support, the support having an axial passage for the reception of a saw cylinder shaft, and means operative to prevent rotation of the support relatively to the shaft when mounted upon the latter.

5. A saw assembly unit ready for application to a whole saw cylinder type shaft, said unit comprising a series of saws and intervening spacers, a support for the saws and spacers, said support comprising spaced heads and a barrel normally uniting the heads, said barrel comprising at least three longitudinally extending circumferentially spaced bars and being of such external diameter as to hold the saws in coaxial relation, one of the heads being fixed to the bars and the other head being removable.

6. A support for saws and spacers comprising spaced heads and an intervening barrel, the barrel comprising a plurality of circumferentially spaced parallel rods, the rods being fixed to one head and removably united to the other head, and a series of longitudinally spaced web members disposed between the heads, each web member having a plurality of openings for the reception of the respective bars, and means uniting the bars to the web members.

7. A support for saws and spacers comprising spaced heads and an intervening barrel, the barrel comprising a plurality of circumferentially spaced parallel rods, the rods being fixed to one head and removably united to the other head, and a series of longitudinally spaced web members disposed between the heads, each web member having peripherally spaced recesses in its edge for the reception of the respective bars, each bar seating in a recess of each web member and being permanently secured to each web member.

8. A support for saws and spacers comprising spaced heads and an intervening barrel, the barrel comprising a plurality of circumferentially spaced parallel rods, the rods being fixed to one head and removably united to the other head, and a series of longitudinally spaced web members disposed between the heads, each web member having a plurality of recesses intersecting its outer edge, said recesses being spaced for the reception of the respective bars, the edge of each web member, adjacent to one at least of its recesses, being cut away to provide a channel to facilitate assembly of the saws with the support.

9. A support having a series of saws and intervening spacers, said support comprising spaced heads and an intervening barrel portion, the barrel portion being of a diameter such as snugly to fit within the openings in the saws and thereby to hold the saws in coaxial relation, one at least of the heads being removable from the barrel portion thereby to permit the saws to be slipped onto the barrel, each head having a central opening, a pair of independent coaxial shaft members, each projecting outwardly through one of said openings thereby to form trunnions for the support with its saws, centering means normally operative to hold the inner ends of said shaft members in coaxial alignment, and means rigidly securing each shaft member to one of the heads respectively, the means which secures the shaft member to the removable head being so constructed and arranged so as to permit said shaft member to be withdrawn at will from the opening in said head.

10. A support having a series of saws and intervening spacers, said support comprising spaced heads, a barrel normally uniting said heads, spaced web members intermediate the heads operative to brace the barrel, one at least of the heads being removable to permit the saws to be slipped onto the barrel, each head having a central opening, a trunnion member projecting outwardly from the interior of the barrel through each of said openings, the inner ends of the trunnion members fitting within central apertures in certain of the web members, and means rigidly securing each trunnion to its respective head, said securing means being so designed and arranged as to permit withdrawal of each trunnion from its respective head, the openings in the heads and webs being axially aligned and of such size as at will to accommodate the shaft of a whole saw cylinder.

11. A saw assembly unit ready for application to a saw cylinder shaft, said unit comprising a series of standard saws of the duplex saw cylinder type and intervening spacers, a cage-like support for the saws and spacers, said support comprising spaced heads, and at least three circumferentially spaced saw centering elements extending from one head to the other and normally uniting the heads, said centering elements being operative to engage the inner edges of the several saws thereby to hold them in coaxial relation, one of the heads being removable to permit the saws to be slipped onto said centering means.

ROBERT W. McLEAN.